Figure 1:
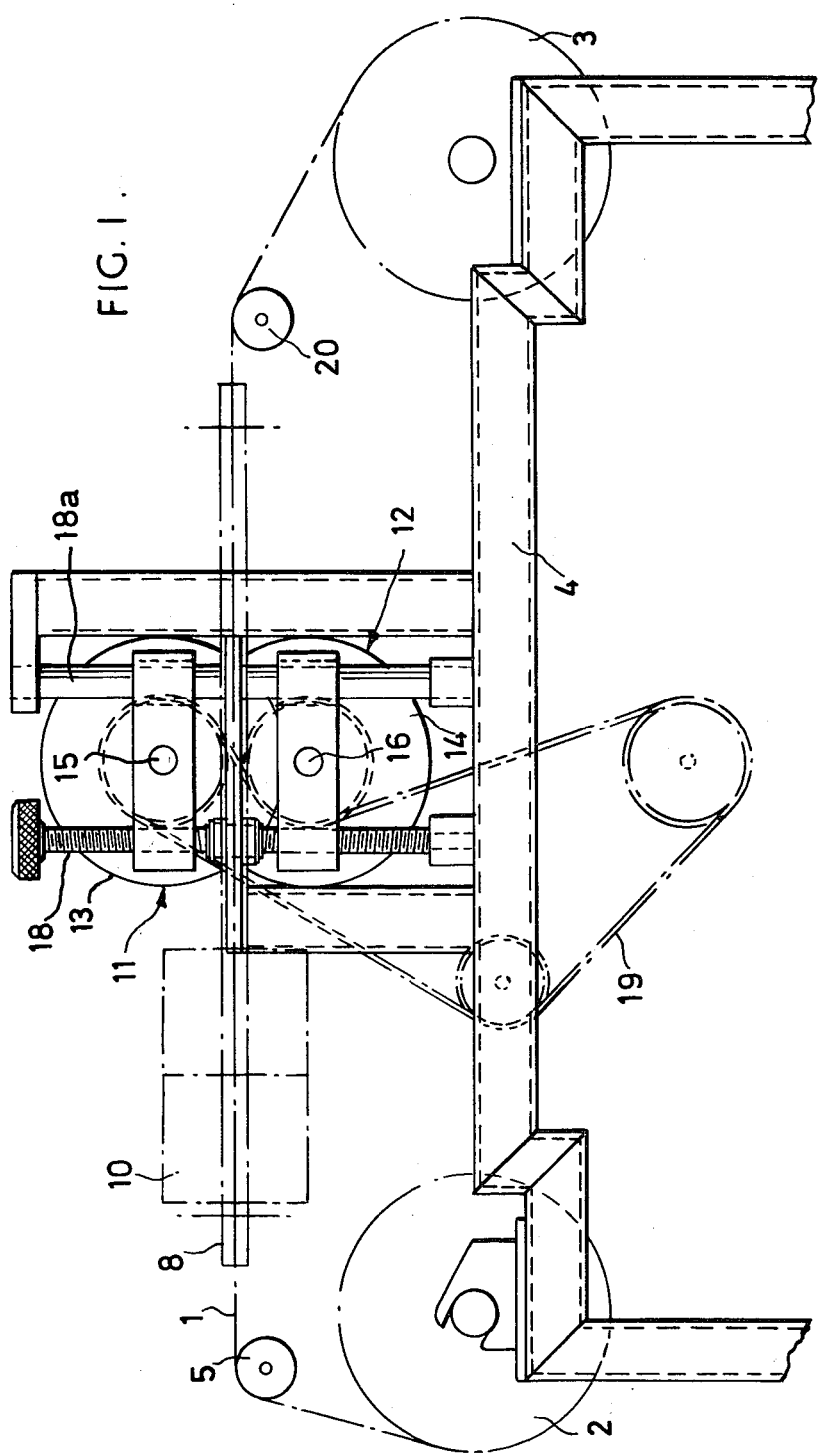

United States Patent [19]

Mercer

[11] 4,087,226
[45] May 2, 1978

[54] STRETCHING WEBS OF SHEET MATERIAL

[75] Inventor: Frank Brian Mercer, Blackburn, England

[73] Assignee: F. B. Mercer Limited, England

[21] Appl. No.: 689,127

[22] Filed: May 24, 1976

[30] Foreign Application Priority Data

May 23, 1975 United Kingdom ............... 22649/75

[51] Int. Cl.² ............................................ B29C 17/02
[52] U.S. Cl. .................................... 425/397; 425/394
[58] Field of Search ............... 425/383, 385, 394, 396, 425/397

[56] References Cited

U.S. PATENT DOCUMENTS

| 2,158,087 | 5/1939 | Rowe et al. | 425/383 X |
| 3,220,056 | 11/1965 | Walton | 425/385 |
| 3,315,301 | 4/1967 | Dibblee et al. | 425/394 X |
| 3,570,064 | 3/1971 | De Groot | 425/397 X |
| 3,577,586 | 5/1971 | Kalwaltes et al. | 425/397 X |
| 3,624,874 | 12/1971 | Lauchenauer et al. | 26/63 |

FOREIGN PATENT DOCUMENTS 94,520  10/1897  Germany.

Primary Examiner—Richard B. Lazarus
Attorney, Agent, or Firm—Holman & Stern

[57] ABSTRACT

Apparatus for transversely stretching a travelling web of flexible material particularly of extruded plastics netting comprising a pair of travelling conveyor means for restraining the longitudinal web margins from moving laterally inwardly and opposed banks of staggered wheels or endless belts between which the web passes while in the grip of the conveyor means and which press on opposite surfaces of the web at alternate spaced locations across its width to transversely stretch the web.

4 Claims, 3 Drawing Figures

STRETCHING WEBS OF SHEET MATERIAL

This invention relates to apparatus for transversely stretching webs of flexible sheet material particularly webs of synthetic plastics material such as synthetic plastics net or film. Apparatus according to the invention is especially useful for the transverse stretching of webs of extruded plastic nets of the type in which the net strands run respectively longitudinally and transversely of the web.

In the past, considerable effort has been directed towards the design of suitable equipment for both the transverse and longitudinal (or Machine Direction) stretching of travelling sheets of synthetic plastics materials and has particularly in the case of transverse (or TD) stretching involved complicated and costly machinery.

It is an object of the present invention to provide a simplified apparatus for the TD stretching of webs of sheet material, particularly extruded synthetic plastics nets of the type indicated.

The invention accordingly provides apparatus for transversely stretching a travelling web of flexible sheet material comprising a pair of edge-restraining members movable in a plane for gripping the longitudinal margins of the web to prevent lateral inward movement of the web margins and a pair of opposed pressure assemblies between which the web can travel whilst in the grip of the edge-restraining members so that the assemblies cause the web to take up an extended path from margin to margin by applying opposed forces respectively to the opposite surfaces of the web at alternate spaced locations across the width of the web so as to cause the web to stretch transversely, each pressure assembly comprising a bank of laterally spaced pressure elements, the elements of one bank being laterally staggered in relation to the elements of the other bank and overlapping the elements of the other bank across said plane to provide said extended path, the pressure elements each having at least a periphery of anti-friction material.

It is necessary, particularly when stretching extruded plastics nets of the type indicated that for optimum and uniform stretching across the width of the web, the anti-friction peripheries of the elements allow maximum lateral slippage of the web across the pressure-applying surfaces of the elements for if the web movement tends to be frictionally inhibited this can lead to longitudinal bands in the stretched product having differential stretch characteristics resulting in a non-uniform product. Accordingly, the pressure elements should have peripheral surfaces with as low a coefficient of friction laterally as possible. For example, the elements can have peripheral surfaces of a highly polished metal or surfaces coated with an anti-friction material such as Polytetrafluoroethylene (PTFE).

The anti-friction elements can for example comprise disc-like rollers, preferably driven rollers, or alternatively may comprise internally supported endless driven belts in which latter case the belts can be guided to have progressively increasing overlap to apply a progressively increasing stretching effect on the web along their length. A similar effect can be obtained with rollers by employing a series of banks of rollers of increasing diameters.

The edge-restraining members may comprise tenter-type conveyor elements with clips or pins or alternatively may comprise pin-wheels or other movable gripping elements.

Figure 2:
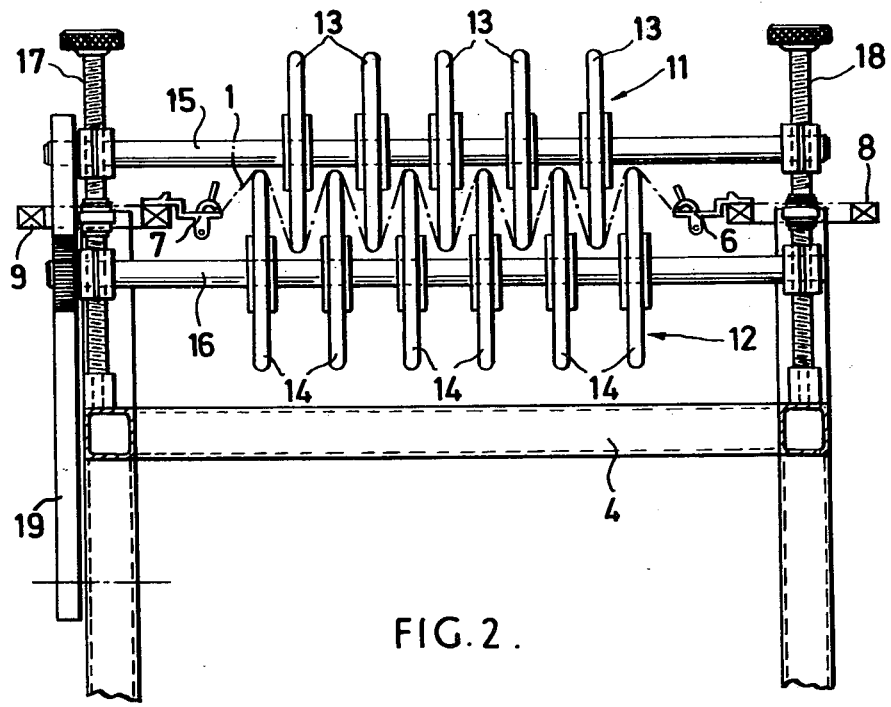
Figure 3:
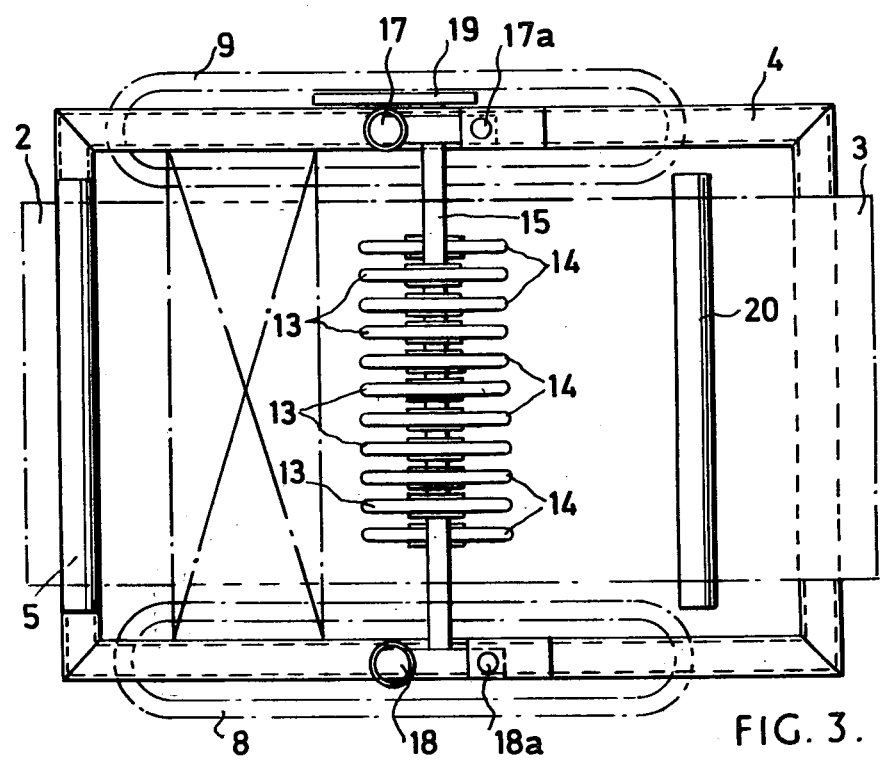

In the accompanying partly diagrammatic drawings which illustrate the invention by way of an example, FIG. 1 is a side elevation, FIG. 2 is an end elevation and FIG. 3 is a plan view of a machine for transversely stretching a web of flexible sheet material.

Referring to the drawings, a web 1 of material to be transversely stretched for example extruded plastics net of the type indicated is unwound from a storage reel 2 onto a driven take-up reel 3, the reels 2 and 3 being journalled at opposite ends of a frame 4. After passing over a guide roll 5, the longitudinal edges of the web are gripped by the clips 6 and 7 of a pair of conventional tenter-type endless conveyor chains 8 and 9 driven at the same linear speed as the travelling web. The clips 6 and 7 lie substantially in the plane of the web and are spaced apart along the whole length of the chains substantially at the original width of the web so that the clips prevent the longitudinal web margins from contracting laterally towards one another.

Whilst in the grip of the clips, the web passes first through a heater 10 (if required for the stretching process) which in the case of the plastics net mentioned may be, for example, a hot air blower or hot water sprays to heat the net to up to 120° C. Then, the web proceeds through a transverse stretching arrangement comprising opposed pressure assemblies 11 and 12 which operate respectively on the upper and lower web surfaces. The assemblies each comprise a series of laterally spaced wheels or disc-like rollers 13, 14 keyed to shafts 15, 16, the rollers 15 being laterally staggered in relation to the rollers 16 and overlapping the rollers 16 vertically across the plane of the clips 6, 7 (i.e. across the original plane of the web). With this arrangement, as the web is drawn through the pressure assemblies between the respective banks of rollers it is transversely stretched into a wave-like or zig-zag form to cause the web to take up an extended path from margin to margin as shown in FIG. 2, the degree of stretch imparted being determined by the degree of vertical overlap of the respective roller banks (i.e. the length of the extended path). As mentioned above, the rollers have anti-friction surfaces to promote lateral slipping of the web across the rollers and uniform stretching of the web across its width. To this end the roller peripheries may be of polished metal or PTFE coated.

The shafts 15, 16 are mounted on screw columns 17, 17a and 18, 18a so that the degree of overlap between the respective roller banks can be adjusted to alter the length of the extended path and hence the degree of transverse stretch imparted to the web and the shafts are driven in opposite directions by a common belt drive arrangement 19 at speeds whereby the peripheral speed of the rollers conforms with the linear speed of the travelling web. (The rollers could be peripheraly notched to assists in driving the web without impairing the lateral slip characteristics of the rollers).

The web leaves the stretching arrangement in a pleated form and after release from the clips passes over a further guide roll 20 before being wound in a pleated form onto the take-up roll 3. Alternatively means may be provided for transversely stretching out the web from its pleated form so that it can be wound flat on the take-up roll.

I claim:

1. Apparatus for transversely stretching a travelling web of flexible plastic sheet material comprising a pair of edge-restraining means for gripping the longitudinal margins of the web to prevent substantial lateral inward movement of the web margins, a pair of opposed pressure assemblies between which the web can travel whilst in the grip of the edge-restraining means so that the assemblies cause the web to take up an extended path from margin to margin by applying opposed forces respectively to the opposite surfaces of the web at alternate spaced locations across the width of the web so as to cause the web to stretch transversely, said edge restraining means gripping the longitudinal margin of the web prior to engagement of the web with said pressure assemblies and releasing the web subsequent to the engagement with the pressure assemblies, each pressure assembly comprising a bank of laterally spaced pressure elements, the elements of one bank being laterally staggered in relation to the elements of the other bank and overlapping the elements of the other bank across a plane containing the web margins with a degree of overlap so as to stretch the web transversely into a pleated form without substantial lateral inward movement of the web margins, the pressure elements each having a web engaging peripheral surface of an anti-friction material which permits lateral slippage between the web and said surface and drive means for continuously advancing the web longitudinally through and between said pressure assemblies, whereby said pressure assemblies continuously deform the web.

2. Apparatus as claimed in claim 1 wherein the edge-restraining members comprise clips mounted on endless conveyor chains, and said driving means includes means for continuously driving said endless conveyor chains.

3. Apparatus as claimed in claim 1 wherein the pressure elements comprise rollers, and said driving means continuously rotating said rollers.

4. Apparatus as claimed in claim 1 wherein the distance between the banks of pressure elements is adjustable to vary the degree of overlap of the respective elements across said plane.

* * * * *